United States Patent [19]

Palmer et al.

[11] 4,406,152

[45] Sep. 27, 1983

[54] METHOD AND APPARATUS FOR CALIBRATING A RAILROAD TANK CAR

[75] Inventors: Rodney L. Palmer, Houston, Tex.; John T. Ostgaard, Los Angeles, Calif.

[73] Assignee: Richmond Tank Car Company, Houston, Tex.

[21] Appl. No.: 257,998

[22] Filed: Apr. 27, 1981

[51] Int. Cl.³ .................... G01F 25/00; G01F 17/00
[52] U.S. Cl. ........................................ 73/1 H; 73/149
[58] Field of Search ............................. 73/1 H, 3, 149

[56] References Cited

U.S. PATENT DOCUMENTS

| | | | |
|---|---|---|---|
| 2,628,493 | 2/1953 | Sandefur | 73/1 H |
| 3,169,396 | 2/1965 | Renoult | 73/1 H |
| 3,680,606 | 8/1972 | Ensign | 141/286 |
| 3,933,027 | 1/1976 | Mehall | 73/3 |
| 4,307,601 | 12/1981 | Jackson | 73/3 |

OTHER PUBLICATIONS

API Standard 2554, ASTM Designation D 1409-65, "Method for Measurement and Calibration of Tank Cars," USAS Z11.201-1966.
Technical Bulletin, TB-70-11, GATX, Aug. 1970.

*Primary Examiner*—S. Clement Swisher
*Attorney, Agent, or Firm*—Pravel, Gambrell, Hewitt, Kirk & Kimball

[57] ABSTRACT

A railroad tank car is calibrated by continuously adding liquid into the tank car from a liquid supply means. The amount of liquid is measured by meter means as the liquid is being continuously added. Depth sensor means continuously determines the depth of liquid in the tank car. A computer is used to monitor the instruments and to obtain a measure of the volume of liquid in the tank car at pre-determined depths and to correlate the volume measure with the measured depth.

4 Claims, 1 Drawing Figure

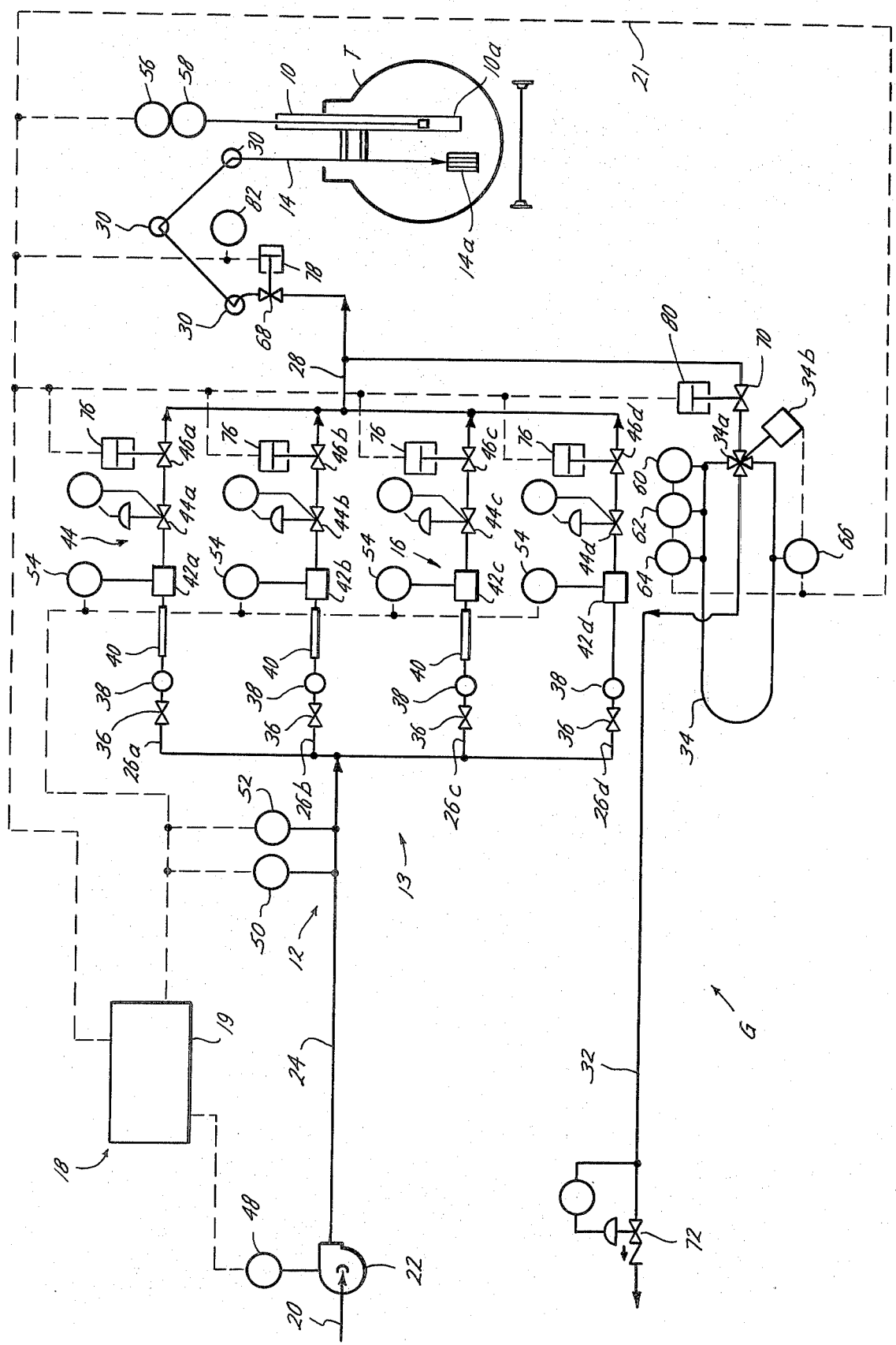

METHOD AND APPARATUS FOR CALIBRATING A RAILROAD TANK CAR

TECHNICAL FIELD

This invention relates to the determination of the volume of liquid in a railroad tank car in correlation to the depth of the liquid in the tank car.

Prior Art

When liquids are sold from railroad tank cars, the amount sold is determined by taking a first reading of the depth of the liquid in the tank car prior to removal and a second reading of the depth of the liquid in the tank after removal. The volume of liquid in a tank car in relation to the liquid depth is typically available for users of the tank car, usually in tabular form called an outage table. Therefore, the change in the volume in the tank car is determined from the depth figures of the liquid in the tank before removal and after removal and the outage table.

Due to the size of tank cars, minor changes in liquid depth often represent significant changes in volume. For this reason, the fluid volume in a tank car is calibrated per one-half or one-quarter inch of depth as reflected in the outage table. The tank car manufacturer generally makes the necessary calibration to form the outage table before the tank car is delivered and the outage table is provided to the purchaser of the tank car.

One method of calibrating a railroad tank car is known as strapping. Measurements are made of the outer dimensions of a railroad tank car at specified locations and the thickness of the walls is determined. From these numbers, a geometrical model of the tank car is created and the volume per depth is calculated from this model. One problem with calibrating by the strapping method is that it does not account for differences between the actual car and the mathematical model caused by variations in wall dimensions and thickness in areas of the tank not measured. A second and greater deficiency is that the dimensions of a tank car are not constant during filling. As liquid is added, the shape of the tank car is deformed by the weight of the liquid. Therefore, any calculations based on an assumed constancy of the tank car dimensions has inherent errors. Attempts have been made to compensate during calibration for dimension changes in the tank car by adding to the tank car a single measured amount of a liquid and measuring the depth to find by actual measurement the depth of liquid at that particular volume. This measurement is then compared with the calculated values for that depth obtained from strapping the tank car and a correction factor is found and applied to all of the values obtained by strapping.

Another method of calibrating is to add volumes of liquid from carefully calibrated tanks to the railroad tank car. When a depth indicator placed in the tank car increases a set distance such as one-half inch, liquid entry is stopped and a notation from the calibrated supply tanks of the volume that has entered the tank car is made. Liquid entry is restarted and the process repeated until the tank is full with volume readings being taken after liquid flow is stopped at each desired depth interval. This method is slow and it sometimes takes more than a day to measure a single tank car. In the tank car industry, this method is generally used to calibrate only one example of each type or model tank car. This method thus ignores significant variations in volume as a function of liquid depth found in each different tank car of a given type or model.

SUMMARY OF THE INVENTION

With the present invention, liquid is continuously added through a liquid conduit to a tank car to be calibrated. The amount of liquid added is measured by a suitable metering mechanism. A depth sensor measures the depth of the liquid in the tank car continuously. A computer monitors the measured depth readings from the depth sensor and the amounts of liquid added as measured by the metering mechanism. From these readings, the computer obtains a measurement of volume of liquid contained in the tank car as each pre-determined increment of depth is reached. In this manner, outage tables for each individual tank car are practically obtainable so that the outage table is an accurate indication of volume versus liquid depth for the particular tank car for which it was obtained.

BRIEF DESCRIPTION OF THE DRAWINGS

The sole FIGURE of the drawings is a schematic diagram of the present invention.

DESCRIPTION OF THE PREFERRED EMBODIMENT

The calibrating apparatus G of the present invention as seen in the drawing is designed to calibrate a railroad tank car T. A depth sensor means 10 has first end 10a inserted in tank car T for continuously measuring depth of liquid in the tank car T. Liquid supply means 12 continuously adds liquid, such as water, to the tank car T from a conduit portion 14 inserted in the tank car T. The amount of liquid added to the tank car T is measured by metering means 16. Calculating means 18 which monitors the depth sensor means 10 and the metering means 16 obtains a measurement of the volume of liquid in the tank car T at a plurality of predetermined depths.

The liquid to fill the tank car T comes from a supply source such as a water storage reservoir (not shown) through inlet pipe 20 drawn by pump 22 which forces the liquid through supply pipe 24. Because it is desirable to vary the rate at which the liquid supply means 12 delivers the liquid, a flow assembly 13 comprising four parallel liquid flow paths or pipes 26a-d are provided, each substantially the same. The liquid from flow paths 26a-d rejoin in a supply pipe 28 which is connected through several flexible joints 30 to conduit portion 14, which allow the liquid conduit 14 to be easily placed within the tank car T.

It is desirable that the piping system be a closed loop so that liquid temperature may be most easily controlled. Therefore, drainage line 32 leads to a sand filter (not shown) to remove any debris then to the water storage reservoir (not shown) from which inlet pipe 20 receives the liquid.

Each liquid flow path 26a-d has an isolation valve 36 which is normally opened. The isolation valve 36 is closed only when it is desired to isolate that particular flow path 26 for repair or maintenance purposes. A strainer 38 is inserted into each flow path 26a-d after the isolation valve 36 to remove debris which might harm a meter. A straightner vane 40 is placed in each flow path 26a-d just before a turbine meter 42 to reduce turbulence and increase the accuracy of the metering, except for flow paths 26*d* which is of such low volume that a straightner vane 40 is not necessary.

Metering means 16 includes four turbine meters 42*a–d* of conventional design with one meter being inserted in each flow path 26*a–d*. A turbulence control means generally designated as 44 includes flow control valves 44*a–d* to control the amount of flow in each flow path 26*a–d*. The flow control valves 44*a* and 44*b* are preset to allow a flow of 600 gallons per minute. The flow control valve 44*d* is preset to allow a flow of 8 gallons per minute. Flow control valve 44*c* is a double-capacity flow control valve preset to allow either 150 gallons per minute or 600 gallons per minute. Remote control valves 46*a–d* determine whether flow is on or off in each flow path 26*a–d* and are controlled by the calculating means 18. By opening and closing the remote control valves 46*a–d*, liquid flow may range from a minimum of 8 gallons per minute to a maximum of 1808 gallons per minute.

The calculating means 18 includes a computer 19 which receives data by way of conventional remote transmitting units (RTU) associated with the various instrumentation and controls various mechanisms by conventional remote control units (RCU). The links between the computer 19 and the RTUs and the RCUs are indicated in the drawing by dotted lines 21. RCU 48 turns the pump 22 on and off. RTU 50 senses temperature in supply line 24. RTU 52 senses pressure in supply line 24. RTU 54 transmits the digital pulse trains from the turbine meters 42*a–d* to allow computer 19 to calculate liquid flow through each flow path 26*a–d*. RTU 56, mounted with depth sensor means 10, transmits the temperature of the fluid in tank car T and RTU 58 transmits signals indicating the depth reading of depth sensor means 10. A prover loop 34, discussed below, has RTU units 60, 62, 64 and 66 which respectively provide the computer 19 with temperature, pressure, and start and stop time signals for calculation of a meter or adjustment factor in the conventional way.

A valve 68 controls flow into the tank car T. A valve 70 controls flow to the prover loop 34 and check valve 72 controls drainage from the apparatus.

The valves 46*a–d*, 68, and 70 are turned on or off by the computer 19 through RCU units 76, 78 and 80, respectively. The valve 68 leading to the tank car T also is controlled by a manual control 82.

Because the accuracy of the depth sensor means 10 is greatest when liquid surface turbulence is minimized, conduit portion 14 is closed at its end and the liquid exits through a plurality of parallel slots in a disperser 14*a* which reduces turbulence.

A conventional prover loop 34 is inserted along drainage line 32 so that meters 42 may be proved and a meter factor may be calculated for each meter 42. In a typical turbine meter, a certain amount of rotation of the turbine blade indicates a specific volume of flow. However, it is known that the actual rotation in response to a volume of flow depends upon a number of factors such as liquid temperature, pressure, age of meter, temperature of meter and composition of liquid. To correct for such meter variables, a prover loop 34 is used to generate a meter factor which can adjust the assumed flow to actual flow. A prover loop 34 has a length of pipe of known volume between RTU 64 and RTU 66. A ball (not shown) lies in the prover loop 34. When this ball passes start switch RTU 64, a signal to computer 19 is generated. A second signal is generated when the ball completes its trip through the prover loop 34 passing stop switch RTU 66. The computer 19 thereby has a known time period in which a known volume of liquid has moved within the prover loop 34. This known volume may then be compared with the calculated volume moving through a meter 42 in the same time period to create an adjustment factor. RTU 62 and 60 measure pressure and temperature in the prover loop 34 so that the meter factor is for that specific temperature and pressure. In this embodiment, the computer 19 will run the prover loop 34 five times for each meter to be proven, thereby calculating an average meter factor and checking that the variance of the meter readings is within acceptable limits. The flow in prover loop 34 is set by valve 34*a* controlled by RCU 34*b*.

Operation

In broad outline, the calibrating apparatus G is operated to continuously add liquid into tank car T through liquid conduit portion 14. The amount of liquid being continuously added is measured by metering means 16. Depth sensor means 10 continuously measures the depth of liquid in tank car T. At pre-determined depths, a measure of the volume of liquid in the tank car T at that depth is obtained from the measured amount of liquid and correlated with the measured depth of liquid.

The calibrating operation is done under computer control with the following detailed steps. Unless stated otherwise, all steps are done under computer control. It is to be understood that, when a valve is opened or closed, it is done by the associated RCU upon computer command and that when an instrument reading is made, it is transmitted to the computer 19 by the associated RTU.

Conduit portion 14 and depth sensor means 10 are placed in the tank car T by an operator. Valves 46*a–d*, 68, and 70, are closed. All RTU units are enabled. Meters 42 are zeroed. Pump 22 is started. Flow control valve 44*c* is set to 600 gallons per minute. Valve 46*a–d* and 70 are opened. A short delay is allowed so that the liquid will reach a steady temperature and pressure. RTU 50 and 52 are sensed to ensure that the liquid is within acceptable temperature and pressure limits. Valves 46*a–d* and 70 are closed. The meters 42 are re-zeroed and valve 68 is opened. Flow control valve 44*c* is set to 150 gallons per minute and valve 46*c* is opened.

At this stage, liquid is flowing through supply line 24 and flow path 26*c* into conduit portion 14 at the rate of 150 gallons a minute and the tank car T is being filled at the same rate. The flow rate past meter 42*c* is being transmitted by RTU 54*c* to the computer 19. The computer 19 uses the information from the turbine meter 42*c* as well as any meter of adjustment factor previously calculated and the temperature reading from RTU 56 to determine accurately the amount of liquid flowing into the tank car T and to obtain a measure of the total volume of liquid that has flowed into the tank car T. Simultaneously, the computer 19 is continuously sensing the depth of liquid in the tank car T from depth sensor means 10. When computer 19 receives signals from RTU 58 indicating that a threshold depth of liquid in the tank car T of 12 inches has been reached, the computer 19 obtains and stores a measure of the total volume of liquid in the tank car T at that depth. Thereafter, at each one-sixteenth inch increase in the depth of liquid, as indicated by depth sensor means 10 and transmitted to the computer 19 by RTU 58, the computer 19 repeatedly obtains and stores a measure of the total volume at each depth until the tank car T is filled.

Depth sensor means 10 is least accurate when the liquid surface is turbulent and, since the liquid surface is most turbulent during the first portion of filling, it is preferred to calculate by other means, such as strapping, the volume for each quarter-inch of the first foot of depth rather than use this method and apparatus. In the alternative, by filling the first foot of the tank car T more slowly, turbulence can be reduced and measurements can be obtained at any depth even in the first foot, which can be defined as a first fill level.

When the depth sensor means 10 indicates a second fill level of 18 inches has been reached in the tank car T, flow control valve 44c is switched to 600 gallons per minute. When the depth has reached a third fill level of 20 inches, valve 46a is opened to add flow path 26a on-line increasing flow rate to 1,200 gallons per minute. After a delay of 30 seconds, valve 46b is opened and the total flow is 1,800 gallons per minute.

When the depth gauge indicates that the liquid has reached a first proximate final fill level of 8 inches from the top of the tank car T, valve 46a is closed, then valve 46c is closed. Flow control valve 44c is switched to 150 gallons per minute and re-opened. After a delay of 5 seconds, valve 46b is closed removing flow line 26b from the system, and leaving only 150 gallons per minute flowing into the tank car T. When a second proximate final fill level of 6 inches from the top of the tank car T is reached, valve 46d is opened adding flow path 26d into the system. After a delay of 2 seconds, valve 46c is shut leaving only 8 gallons per minute flowing into the tank car T. The operator then visually observes the filling, waiting for the top of the tank car T to be reached by the liquid. The moment of topping is generally determined by waiting for the liquid to flow over a flat edge which has been inserted into the tank car T. When the top is reached, the operator presses manual control 82 which closes the valve 68, and causes computer 19 to take a final reading from meter means 16 which is used to determine the total volume for the tank car T. The computer 19 then resets the valves for hydrostatic pressure testing of the tank car T if desired or for another calibrating run.

Prior to beginning the calibrating operation, each meter 42 may be proved using the prover loop 34 as discussed above. The computer 19 will close valves 46a-d, 70 and 78 then zero all meters. Pump 22 is started, valve 46a and 70 are opened, valve 34a is controlled to prove meter 42a. Valve 46a is shut, valve 46b is opened and meter 42b is proved. Flow control valve 44c is set to 600 gallons per minute, valve 44b is shut and valve 44c is opened so that a meter factor for meter 42c at the high rate may be calculated. Valve 46c is shut, flow control valve 44c is set to 150 gallons per minute and valve 46c is opened to prove meter 42c at the low rate. Valve 46d is opened to add flow from path 26d to flow from path 26c to prove meter 44d. The flow in path 26d is so low that a meter factor can most accurately be calculated by having flows in paths 26c and 26d combined, with the effect of path 26c being removed by computer 19 during calculations.

In addition to the meter factor provided from the prover loop 34, the computer 19 can correct the volume figure by compensating in its calculations by conventional means for variations in the temperature of the liquid in the tank car T.

After the calibration is completed, the computer 19 produces an outage table for each quarter-inch of depth from the bottom to the top of the tank car T by averaging the one-sixteenth inch readings. The computer 19 at all times makes corrections for the known volume of liquid in the pipes between the meters 42 and the conduit outlet 14.

The foregoing disclosure and description of the invention are illustrative and explanatory thereof and various changes in the size, shape and materials as well as the details of the illustrated construction and additions may may be made without departing from the spirit of the invention.

We claim:

1. A method for calibrating a railroad tank car, comprising the steps of:

continuously adding liquid into the tank car to be calibrated;

measuring by instruments the amount of liquid as it is being continuously added to the tank car;

continuously measuring by instruments the depth of liquid in the tank car as it is continuously added;

obtaining a measure of the volume of liquid in the tank car at pre-determined depths and correlating such obtained measure with the measured depth of liquid in the railroad tank car;

calibrating said instruments used to measure the amount of liquid added prior to adding liquid to the tank to find an adjustment factor;

using said adjustment factor to correct the volume measurements obtained;

continuously measuring the temperature and pressure of the liquid added to the tank car; and using the temperature and pressure measurements to correct the volume measurements obtained.

2. The method of claim 1, further comprising the step of:

varying the rate at which liquid is added to the tank car by utilizing parallel flow paths independently monitored to decrease the turbulence of the liquid surface in certain portions of the filling cycle and to maximize flow in other portions of the filling cycle and increase the accuracy of the depth measurement.

3. The method of claim 2, further comprising the step of:

beginning the continuous measurement of depth and obtaining a measure of volume after the liquid depth in the tank car reached a threshold level.

4. Apparatus for calibrating a railroad tank car, comprising:

depth sensor means for continuously determining the depth of liquid in a railroad tank car being calibrated;

liquid supply means for continuously adding liquid to the tank car, said liquid supply means including a flow assembly having a conduit portion insertable into the tank car to be calibrated;

said flow assembly including turbulence control means for varying the rate at which liquid is added to a railroad tank car in order to control the turbulence of the liquid in the tank car, said turbulence control means including a plurality of flow paths in parallel and means to activate various combinations of said flow paths to vary the rate of liquid addition to the railroad tank car;

meter means operably connected with the flow assembly for measuring the amount of liquid added to such tank car;

calculating means for monitoring said depth means and said meter means and obtaining a measurement of the volume of liquid added to the tank car at a plurality of pre-determined depths and correlating such volumes to such pre-determined depths; and temperature and pressure monitoring means for measuring the temperature and pressure of liquid added to a railroad tank car and the temperature and pressure in said liquid supply means and providing the temperature and pressure readings to said calculating means.

* * * * *